United States Patent
Jopson et al.

(10) Patent No.: US 6,380,533 B1
(45) Date of Patent: Apr. 30, 2002

(54) METHOD FOR MEASUREMENT OF FIRST- AND SECOND-ORDER POLARIZATION MODE DISPERSION VECTORS IN OPTICAL FIBERS

(75) Inventors: Robert Meachem Jopson; Herwig Werner Kogelnik, both of Rumson; Lynn Elizabeth Nelson, Eatontown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/390,033

(22) Filed: Sep. 3, 1999

Related U.S. Application Data

(60) Provisional application No. 60/120,655, filed on Feb. 19, 1999.

(51) Int. Cl.$^7$ .................................................. G02F 1/01
(52) U.S. Cl. .................. 250/225; 250/227.17; 356/364
(58) Field of Search ........................... 250/225, 227.17; 356/364–366; 359/156; 385/11

(56) References Cited

U.S. PATENT DOCUMENTS

| | | | | |
|---|---|---|---|---|
| 5,717,489 A | * | 2/1998 | Ozeki et al. | 356/364 |
| 5,995,228 A | * | 11/1999 | Otani et al. | 356/364 |

* cited by examiner

*Primary Examiner*—Que T. Le
*Assistant Examiner*—Thanh X. Luu
(74) *Attorney, Agent, or Firm*—Moser, Patterson & Sheridan L.L.P.

(57) ABSTRACT

The present invention consists of a method and apparatus for measuring first and higher order PMD vectors in optical fibers. For each first-order PMD vector determination, two distinct polarization states are sequentially injected into an optical device under test for each of a pair of frequencies $\omega$ and $\omega+\Delta\omega_f$. A Stokes vector $s_1$ representing the first polarization state must not be parallel or anti-parallel to a Stokes vector $s_a$ representing the second polarization state, but the relative angle between $s_1$ and $s_a$ need not be known. The frequency interval $\Delta\omega_f$ is large to obtain a high signal-to-noise ratio. Thus, four light beams are injected, the first at frequency $\omega$ and polarization $s_1$, the second at frequency $\omega$ and polarization $s_a$, the third at frequency $\omega+\Delta\omega_f$ and polarization $s_1$, and the fourth light at frequency $\omega+\Delta\omega_f$ and polarization $s_a$. The output polarizations of these beams are measured and four corresponding output Stokes vectors are determined. A first-order PMD vector is then calculated from the four input Stokes vectors and four output Stokes vectors. Each subsequent PMD vector determination is then made using a pair of frequencies which differs from the previous pair of frequencies by a frequency interval $\Delta\omega_i$ which is small compared to $\Delta\omega_f$. Since $\Delta\omega_i$ can be small, high spectral resolution of the PMD vector can be obtained, while still maintaining good signal-to-noise ratio provided by using a large $\Delta\omega_f$. The good signal-to-noise ratio and high spectral resolution of the PMD vector allow the accurate determination of second- and higher-order PMD vectors.

30 Claims, 4 Drawing Sheets

METHOD FOR MEASUREMENT OF FIRST- AND SECOND-ORDER POLARIZATION MODE DISPERSION VECTORS IN OPTICAL FIBERS

This application claims the benefit of U.S. Provisional Application No. 60/120,655, filed Feb. 19, 1999.

FIELD OF THE INVENTION

The present invention relates generally to the field of fiber optic communications and specifically to the measurement of first- and higher-order polarization mode dispersion vectors in optical fibers.

BACKGROUND OF THE INVENTION

Dispersion refers to the tendency of a light beam to spread out in time as it propagates through optical fiber. Several types of dispersion occur in optical fibers. One type is known as polarization mode dispersion.

Polarization mode dispersion refers to an effect that an optical device, such as a span of optical fiber, has on the separate polarizations of a light beam. A light beam can be approximated as having electrical components that vibrate at right angles to the direction of travel. In the simple case of a short fiber section the polarization or state of polarization of the light beam can be thought of as the direction of these right angle vibrations, where the light beam travels in a straight line. In the more general case, these components are superimposed in a more complex way. As shown in FIG. 1, within a short optical fiber section 10, an orthogonal set of two polarized waveguide modes 20 and 30 can be found which have electric field vectors aligned with the symmetry axes of the fiber. The polarization of a light beam propagating through the fiber section can be represented by vector components aligned with these polarization waveguide modes of the fiber as shown in FIG. 2. In FIG. 2, the polarization waveguide modes 20 and 30 are shown as two axes. The input polarization 40 is represented as the vector sum of two components 50 and 60 which are aligned with the polarization waveguide modes of the fiber section.

In ideal fiber, which has a perfect circular cross-section and is free from external stresses, the propagation properties of the two polarized waveguide modes are identical. However, imperfections introduced in the manufacturing process may result in fiber that is not perfectly circular. In addition, fiber that has been installed may suffer from external stresses such as pinching or bending. These manufacturing imperfections and external stresses cause the two polarized waveguide modes to have different propagation characteristics which in turn gives rise to polarization mode dispersion, or "PMD".

PMD affects the polarization of a light beam with respect to both time and frequency. With respect to time, PMD causes the two vector components comprising the polarization of the light beam to propagate down the two polarization waveguide modes at different velocities and thus separate in time as seen in FIG. 3. In FIG. 3, the two components 50 and 60 of input polarization 40 are aligned with polarization waveguide modes 20 and 30. This time gap is known as the differential group delay, "DGD" or $\Delta\tau$. For the simple case of a short fiber section, PMD causes the polarization of the light beam at the output of the fiber section to vary with frequency in a periodic fashion when the polarization of the light beam at the input remains fixed. However, in the general case of PMD, most fibers can be modeled as many such fiber sections whose axes are oriented at random angles relative to each other. Although the behavior is more complex, the PMD effects of this random combination are similar to the simple case above over a narrow frequency range. Instead of two polarization waveguide modes, there are pairs of special polarizations, called the principal states of polarization, both at the input and output, displaying the differential group delay.

A convenient way to represent the effects of PMD caused by a particular optical device or span of optical fiber is using Stokes space, a three-dimensional geometrical space, and the Poincaré sphere, a sphere within Stokes space where every possible polarization state maps to a specific (and different) point on the sphere. For instance, the positive $s_1$ axis of the Poincare sphere represents horizontal linear polarization, while the positive $s_2$ axis represents 45-degree linear polarization, and all linear polarizations are on the equator.

The frequency effect of PMD can be easily seen when displayed on the Poincaré sphere. As shown in FIG. 4, for a light beam having a fixed input polarization 40, the output polarization 70 of the light beam moves locally in a circle on the surface of the Poincaré sphere as the frequency of the light beam is varied from $\omega_1$ to $\omega_2$ to $\omega_3$.

Using Stokes space and the Poincaré sphere, the various effects of PMD for a given optical device or span of fiber may be compactly represented using a single, three-dimensional vector referred to as the PMD vector or $\Omega$. The magnitude of the PMD vector, $|\Omega|$, describes the time effect of PMD and the rate of rotation of the output polarization with respect to frequency. In other words, $|\Omega|=\Delta\tau$. The direction of the PMD vector describes the axis of the rotation. Finally, the direction of the PMD vector also describes an axis that intercepts the Poincaré sphere at two points on the surface of the sphere. These two intercept points represent the two principal states of polarization for the optical device or fiber.

A principal state of polarization, "PSP", is a property of an optical device or span of fiber such that if a light beam's polarization is aligned with the PSP at the input of the optical device or fiber, to first order, the light beam's polarization at the output will not change when the light beam's frequency at the input is varied. However, to second and higher orders with frequency, the output polarization does change. In the absence of polarization-dependent loss, each optical device or span of fiber has an orthogonal pair of PSP's for each frequency. Polarization dependent loss refers to the difference in the amount of loss a light wave can experience with changes in its state of polarization.

Since PMD can limit the transmission bandwidth of optical fiber, measurement of the PMD of a span of fiber is necessary to determine the span's data transmission capability as well as to provide information for compensating the PMD in the span. Although there are currently many methods for measuring PMD, most of these methods only provide a measurement of the magnitude of PMD, i.e., the differential group delay, and do not provide information on the PMD vector characteristics. Determination of the full vector characteristics of PMD is necessary for deducing the effects of higher order PMD. Higher order PMD describes the change of the PMD vector with frequency. Knowledge of the higher order PMD effects is necessary where there are significant changes of the PMD vector across the signal frequency bandwidth.

There are two commonly used methods that provide information on the PMD vector—the Poincaré Sphere Technique, "PST," and the Jones Matrix Eigenanalysis, "JME." A general prior art apparatus for measuring PMD that is common to both methods is shown in block diagram form in FIG. 5. A light source 100 capable of operating at different frequencies, such as a tunable laser, inputs a light beam of a chosen frequency. A polarizing device 110, such as one or more linear polarizers, then imparts a chosen polarization state to the light beam. A control block 120, which could be a computer, controls the frequency of light source 100 and chooses the polarization imparted by polarizing device 110. The polarization state of the light beam may be represented by a vector in Stokes space and in the Poincaré sphere. The light beam then passes through the device under test 130 which could be a span of optical fiber. A measuring device 140, such as a polarimeter, measures the polarization state of the light beam at the output of the device under test. The data obtained from the measuring device is then analyzed in analysis block 150, which could be a computer, to determine the PMD vector characteristics.

The Poincaré Sphere Technique requires the input of at least two distinct polarization states, i.e. production of two light beams having distinct polarization states. For each input polarization state, the input frequency is varied and the output polarization state measured. The resulting data is then differentiated with respect to frequency to obtain the magnitude and direction of the PMD vector.

The Poincaré Sphere Technique has several shortcomings. First, although the input of two distinct polarization states is required, the input of a third distinct polarization state is often necessary. Where the resulting PMD vector would be coplanar with the vectors representing the first two polarization states in Stokes space, subsequent calculations using data only from these first two polarization states would be impossible because there would be division by zero. In such an instance, additional data must be obtained from the input of a third distinct polarization state. This input of an additional polarization state adds complexity to the overall testing system because a circular or elliptical polarizer must be used to input this third polarization state whereas linear polarizers are sufficient for the first two input polarization states.

Another shortcoming of the Poincaré Sphere Technique is that for each input polarization state, measurements must be taken at closely spaced frequencies. In practicality, it is very difficult to obtain accurate data for small frequency intervals using currently available commercial instrumentation. Such data often suffers from a low signal-to-noise ratio.

The Jones Matrix Eigenanalysis inputs three input polarization states at a first frequency and then measures the corresponding output polarization states. From the known input polarization states and the measured output polarization states, the Jones matrix corresponding to the first frequency is calculated. The process is repeated for a second frequency and from the two Jones matrices, the PMD vector may be calculated. Thus a total of six light beams must be input to the optical device under test.

The JME method does not necessarily suffer from data with a low signal-to-noise ratio because in the JME method, measurements can be taken at larger frequency intervals. However, using larger frequency intervals over the same frequency range results in the problem of fewer measurements being taken and thus fewer data points being available. In turn, fewer data points reduces the resolution of a plot of the changes of PMD with frequency. Without adequate resolution of the plot of first order PMD, determinations of higher orders of PMD become inaccurate.

The JME method also has other shortcomings. Although the initial measurements of the output polarizations are done in Stokes space, the data is then converted to Jones space in order to obtain the Jones matrices. The results from the Jones matrices must then be reconverted to Stokes space in order to obtain the PMD vector. In addition to these added conversion and reconversion steps, the calculations themselves which are done in Jones space are more complicated than calculations performed within Stokes space. Thus, the algorithm to calculate the PMD vector with this method is much more complex than an algorithm which calculates the PMD vector fully within Stokes space.

Another shortcoming of the JME method is that the relative angles between the first, second, and third input polarization states must be known precisely in order to perform the calculations of the JME method. In practice, it is difficult to precisely determine the relative angle between the input polarization states. Consequently, accuracy in the subsequent PMD calculations may suffer.

SUMMARY OF THE INVENTION

The present invention consists of a method and apparatus for measuring first and higher order PMD vectors in optical fibers. Unlike existing methods, the current method requires the input of only two distinct polarization states. Also, the method of the present invention does not require knowledge of the relative angle between the two polarization states. In addition, the algorithm of the present method is simpler than that of the prior art because it remains entirely in Stokes space. The frequency interval of each measurement pair can be large to enable a high signal-to-noise-ratio measurement of each individual PMD vector. Finally, the frequency interval between each individual PMD vector determination (i.e. at the center frequency of each pair) can be small, providing good resolution of PMD variation with frequency. This allows accurate determination of second-order PMD.

For each PMD vector to be determined, four light beams are sequentially injected into an optical device under test, or "DUT", the first light beam having a frequency $\omega$ and a first polarization state represented by vector $s_1$ in Stokes space, the second light beam having a frequency $\omega$ and a second polarization state represented by vector $s_a$ in Stokes space, the third light beam having a frequency $\omega+\Delta\omega_f$ and a first polarization state represented by vector $s_1$ in Stokes space, and the fourth light beam having a frequency $\omega+\Delta\omega_f$ and a second polarization state represented by vector $s_a$ in Stokes space. In other words, two distinct polarization states, represented by Stokes vectors $s_1$ and $s_a$, are sequentially injected into an optical device under test with each polarization state being injected at a pair of frequencies $\omega$ and $\omega+\Delta\omega_f$. Of the four numbers needed to fully describe $s_1$ and $s_a$, only three are needed by the algorithm. This provides experimental simplicity. For instance, linear polarizers can be used to provide $s_1$ and $s_a$, but the angle between them need not be known.

Note that vector $s_1$ must not be parallel or anti-parallel to vector $s_a$. Also, the frequency interval $\Delta\omega_f$ is large but should not exceed $\pi/\Delta\tau_m$, where $\Delta\tau_m$ is the peak PMD of said DUT in the frequency span measured. Better accuracy can be obtained with large $\Delta\omega_f$.

The polarization state of the four light beams coming out of the optical device under test are measured, and four output Stokes vectors representing each measured polarization state in Stokes space are determined. A first-order PMD vector is then determined from the four input Stokes vectors, i.e., $s_1$ at $\omega$ and $\omega+\Delta\omega_f$ and $s_a$ at $\omega$ and $\omega+\Delta\omega_f$, and from the four output Stokes vectors. Each subsequent PMD vector determination is then made using a pair of frequencies which is greater than the previous pair of frequencies by a frequency interval $\Delta\omega_i$ which is small compared to $\Delta\omega_f$. Thus, if $\omega_0$ and $\omega_0+\Delta\omega_f$ is the first pair of frequencies used, then $\omega_1$ and $\omega_1+\Delta\omega_f$ is the second pair of frequencies used, and $\omega_2$ and $\omega_2+\Delta\omega_f$ is the third pair of frequencies used, etc., where $\omega_1=\omega_0+\Delta\omega_i$, and $\omega_2=\omega_1+\Delta\omega_i$, etc., and $\Delta\omega_i<\Delta\omega_f$. This technique of using a smaller frequency interval between each pair than the frequency interval separating the frequencies of each pair can be used with any PMD measurement method to provide good resoultion of PMD variation with frequency. It will be recognized by one skilled in the art that the intervals $\Delta\omega_f$ and $\Delta\omega_i$ can vary for different pairs.

DETAILED DESCRIPTION OF THE INVENTION

Figure 1:
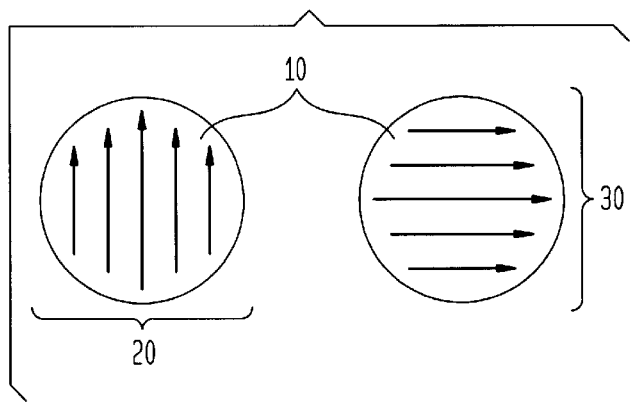
FIG. 1 shows the two orthogonal polarization modes of an optical fiber.
Figure 2:
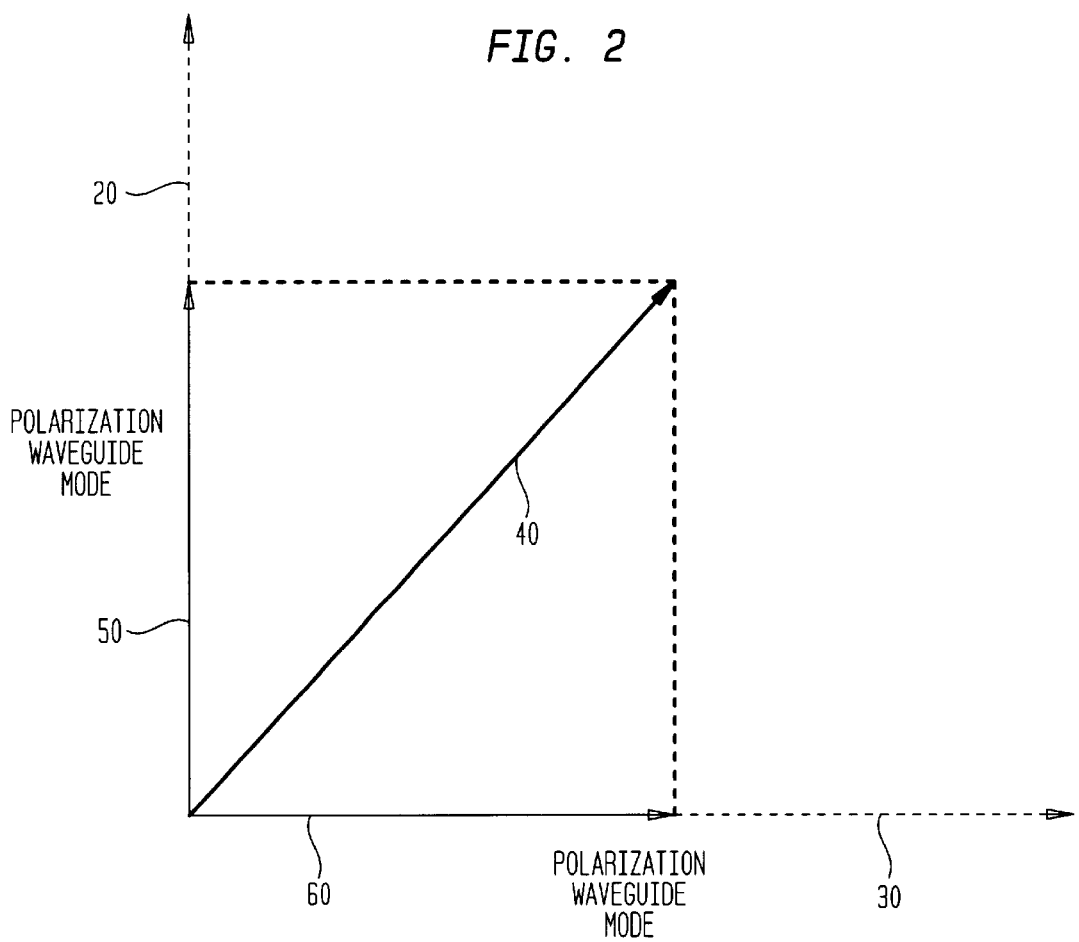
FIG. 2 shows a light beam polarization separated into vector components aligned with the polarization modes of an optical fiber.
Figure 3:
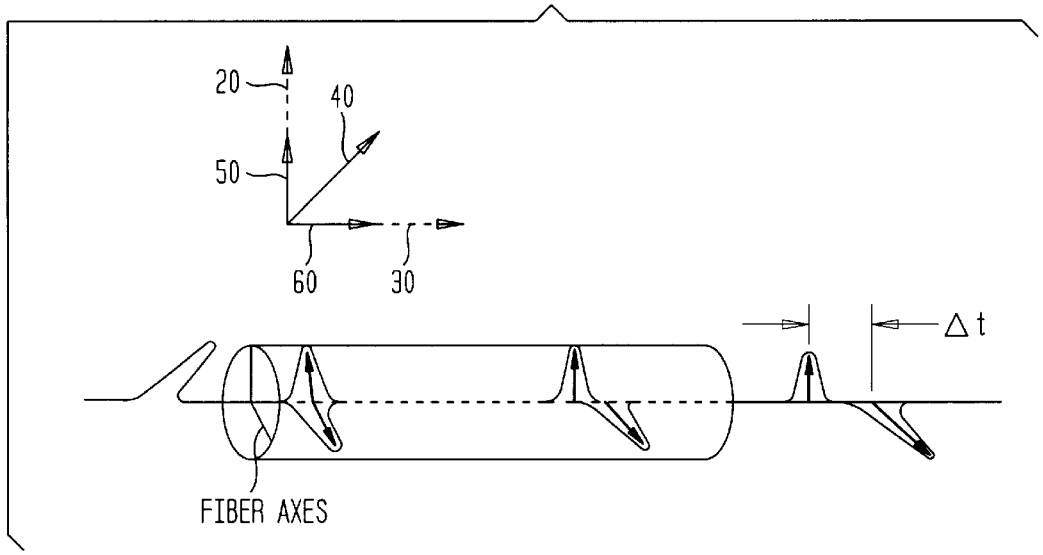
FIG. 3 shows the differential group delay caused by PMD.
Figure 4:
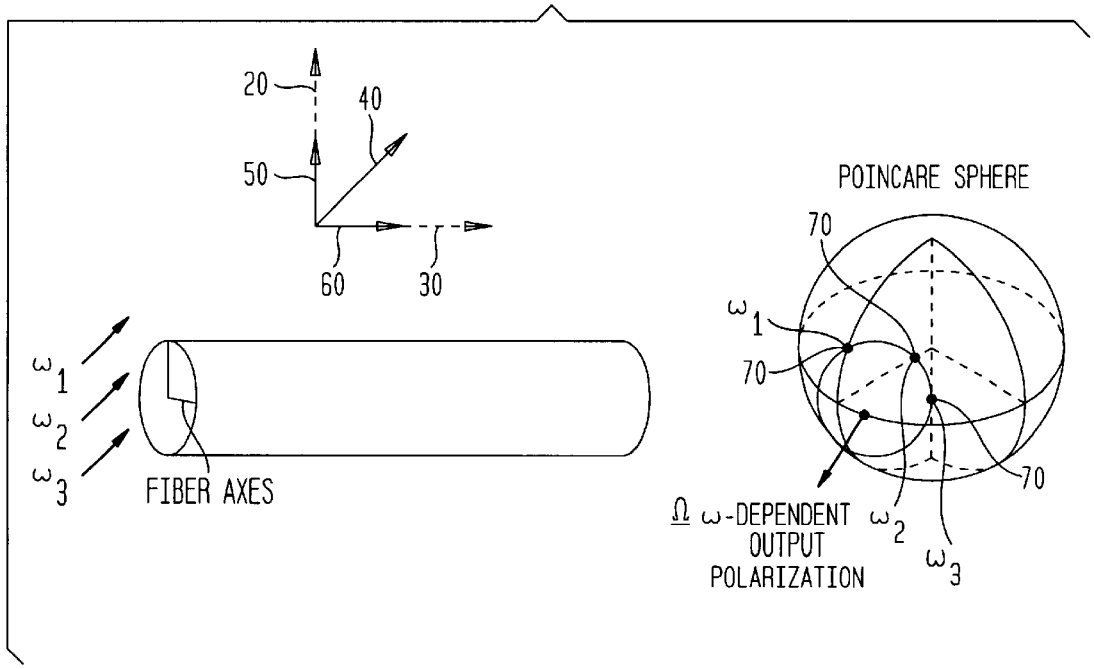
FIG. 4 shows the rotation of the output polarization with frequency caused by the PMD of a simple fiber section.
Figure 5:
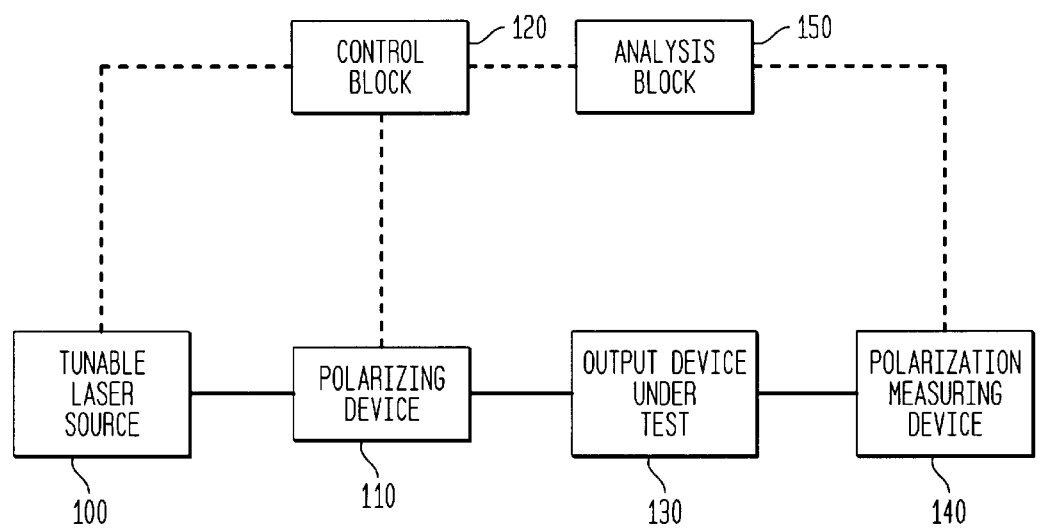
FIG. 5 shows a block diagram of a general apparatus employed by prior art methods to measure PMD.

In the method of the present invention, only two distinct polarization states need be input for each first-order PMD vector to be determined. This is an advantage over the prior art methods which generally require at least three distinct input polarizations.

Specifically, in the present method, four light beams are produced and injected into an optical device under test for each first-order PMD vector determination—the first light beam having a frequency $\omega$ and a first polarization state represented in Stokes space by a vector $s_1$, the second light beam having a frequency $\omega$ and a second polarization state represented in Stokes space by a vector $s_a$, the third light beam having a frequency $\omega+\Delta\omega_f$ and a first polarization state represented in Stokes space again by a vector $s_1$, and the fourth light beam having a frequency $\omega+\Delta\omega_f$ and a second polarization state represented in Stokes space again by a vector $s_a$. In other words, two distinct polarization states, represented by Stokes vectors $s_1$ and $s_a$, are sequentially injected into an optical device under test with each polarization state being injected at a pair of frequencies $\omega$ and $\omega+\Delta\omega_f$. Thus for each PMD vector to be determined, there are four input Stokes vectors—two vectors $s_1$, one at frequency $\omega$ and the other at frequency $\omega+\Delta\omega_f$ and two vectors $s_2$, one at frequency $\omega$ and the other at frequency $\omega+\Delta\omega_f$.

The method of the present invention can be described with reference to FIG. 6 which shows an illustrative apparatus of the present invention. Control block 1000 is a device, which may be a computer, which directs the actions of optical source 1100 and polarizing device 1200. For each PMD vector to be determined, control block 1000 directs optical source 1100, which may be any tunable wavelength source, to sequentially emit four light beams, two at frequency $\omega$ and two at frequency $\omega+\Delta\omega_f$. Control block 1000 then directs polarizing device 1200 to impart a first polarization state to the first light beam having frequency $\omega$, a second polarization state to the second light beam having frequency $\omega$, a first polarization state to the first light beam having frequency $\omega+\Delta\omega_f$ and a second polarization state to the second light beam having $\omega+\Delta\omega_f$.

Polarizing device 1200 may be any device or group of devices that is capable of imparting one of two polarization states such that vector $s_1$ representing the first polarization state in Stokes space is neither parallel nor anti-parallel to vector $s_a$ representing the second polarization state in Stokes space. For linear polarizations, the $s_1$ axis of the Poincare sphere can be defined to be aligned with the input polarization $s_1$.

Vectors $s_1$ and $s_a$ each have three components in Stokes space, but one of these is redundant because the vectors have unit magnitude and the third component can be determined from the other two. Thus four numbers fully describe the two vectors $s_1$ and $s_a$.

However, the PMD calculation algorithm of the present inventive method only requires three of these numbers. This provides experimental simplicity. For instance, linear polarizers can be used to provide $s_1$ and $s_a$, but the relative angle between them need not be known. This is an advantage over the prior art where the relative angle between the distinct input polarizations must be precisely known. It will be appreciated by one skilled in the art that the restriction of input polarization states to linear in the following discussion can be removed at the cost of additional complexity. It will also be appreciated by one skilled in the art that the restriction of the first input state being aligned with $s_1$ of a particular orientation of Stokes space can be removed at the cost of additional complexity.

Figure 6:
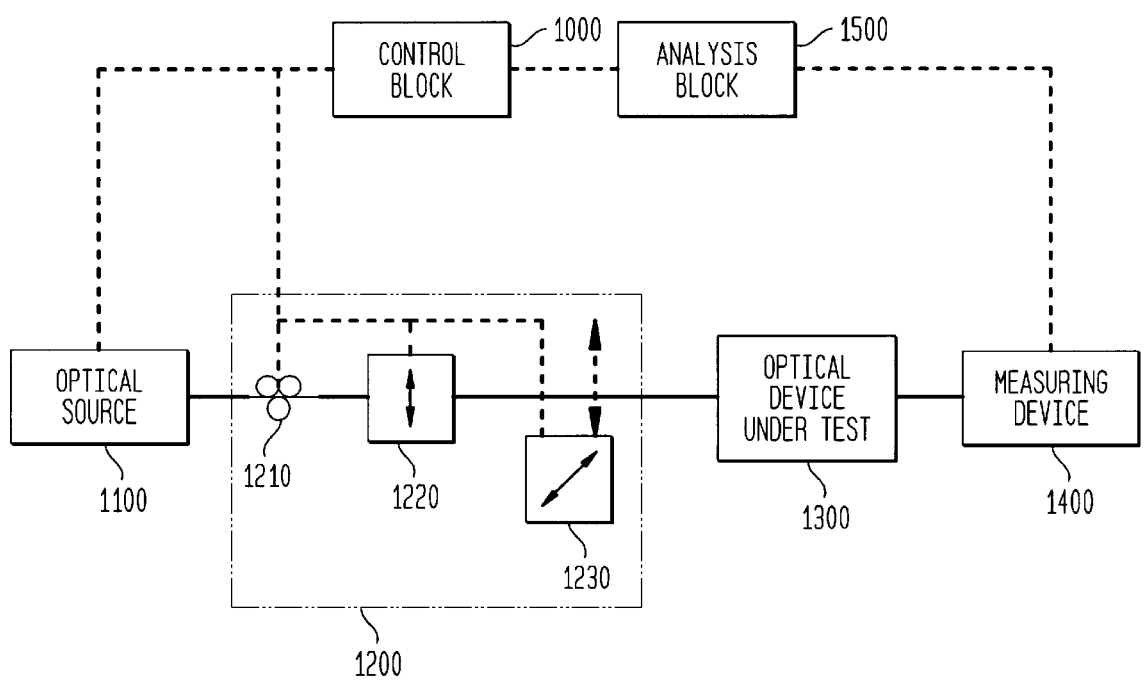
FIG. 6 shows a block diagram of an apparatus used by the method of the present invention.

As illustrated in FIG. 6, polarizing device 1200 may be composed of a polarization controller 1210, a first, wavelength independent, linear polarizer 1220, and a second, wavelength independent, linear polarizer 1230. Polarization controller 1210 is adjusted such that the optical beams are not fully attenuated by polarizer 1220 or polarizer 1230. The orientation of polarizer 1220 defines the $s_1$ axis of the Poincaré sphere. For simplicity in implementation, the position of polarizer 1220 may optionally be fixed such that polarizer 1220 always imparts a first polarization state to any light beam emitted from optical source 1100. The polarization state of polarizer 1230 is never parallel or anti-parallel to the polarization state of polarizer 1220, but is otherwise variable. Thus $s_a$, the Stokes vector representing this second input polarization, may vary with each frequency in the frequency span being measured. Also, polarizer 1230 may be moved into or out of the path of the emitted light beams as directed by control block 1000. Control block 1000 directs polarizing device 1200 to impart a first polarization state to an emitted light beam by moving polarizer 1230 out of the beam path. Control block 1000 directs polarizing device 1200 to impart a second polarization state to an emitted light beam by moving polarizer 1230 into the beam path.

The magnitude of the frequency interval $\Delta\omega_f$, or $|\Delta\omega_f|$, separating the input polarization states is large; however, if it is too large, the measured PMD will fold back on itself as a consequence of the periodic nature of rotations of polarization. If this data folding is to be avoided, $|\Delta\omega_f|$ should not exceed $\pi/\Delta\tau_m$, where $\Delta\tau_m$ is the peak PMD of the DUT in the frequency span measured. Generally, if the mean DGD, or $\Delta\tau_{mean}$, of the fiber being measured is known, then it can be estimated that $\Delta\tau_m$ will rarely exceed $3\times\Delta\tau_{mean}$. Thus, to avoid data-folding, $\Delta\omega_f$ can be chosen accordingly, i.e., $|\Delta\omega_f| < \pi/(3 \times \Delta\tau_{mean})$.

Unlike the prior art PST method, where small frequency intervals between polarization state inputs result in measured data having a low signal-to-noise ratio, the method of the present invention uses a large frequency interval between polarization state inputs which results in measured data having a high signal-to-noise ratio.

It should be appreciated by one skilled in the art that $\Delta\omega_f$ may be either positive or negative. Also, $\Delta\omega_f$ may vary for different frequency pairs.

Each emitted light beam then passes through the optical device under test 1300, which could be a span of optical fiber. For simplicity, the following discussion assumes that the optical device under test 1300 has distinct output and input interfaces, but for some optical devices, such as a Bragg reflector, the output and input interfaces will coincide. It will be appreciated by those skilled in the art that in the latter case, a component such as a directional coupler or a circulator can be used to provide a distinct output interface. Each beam is then received by measuring device 1400 which measures each beam's polarization state and determines the vector which represents this polarization state in Stokes space. Measuring device 1400 could be any device or combination of devices which measures a light beam's polarization state and determines the vector which represents this polarization state in Stokes space. In the present embodiment device 1400 may be a polarimeter.

For each PMD vector to be determined, measuring device 1400 receives four beams and determines four output Stokes vectors each of which represents the polarization of one beam in Stokes space. An output Stokes vector $t_1$ represents the measured polarization state of the beam which was emitted at frequency $\omega$ and given a first polarization state represented by vector $s_1$. An output Stokes vector $t_a$ represents the measured polarization state of the beam which was emitted at frequency $\omega$ and given a second polarization state represented by vector $s_a$. A second output Stokes vector $t_1$ represents the measured polarization state of the beam which was emitted at frequency $\omega+\Delta\omega_f$ and given a first polarization state represented by vector $s_1$. And a second output Stokes vector $t_a$ represents the measured polarization state of the beam which was emitted at frequency $\omega+\Delta\omega_f$ and given a second polarization state represented by vector $s_a$.

For each PMD vector to be determined, eight Stokes vectors are forwarded to analysis block 1500. These vectors are input Stokes vectors $s_1$ and $s_a$ and output Stokes vectors $t_1$ and $t_a$ at frequency $\omega$ and input Stokes vectors $s_1$ and $s_a$ and output Stokes vectors $t_1$ and $t_a$ at frequency $\omega+\Delta\omega_f$. Analysis block 1500 then uses each set of eight vectors to calculate each PMD vector according to the algorithm of the present invention. The PMD vector is then defined to be at the frequency between the frequency pair $\omega$ and $\omega+\Delta\omega_f$.

Analysis block 1500 may be any device capable of carrying out the algorithm of the present invention. For example, analysis block 1500 may be a computer. Alternatively, electrical circuits could be designed so as to carry out the required calculations.

The algorithm of the present invention can be separated into two steps. First, for each pair of frequencies $\omega$ and $\omega+\Delta\omega_f$, two rotation matrices are calculated, one from Stokes vectors $s_1$, $s_a$, $t_1$, and $t_a$ corresponding to frequency $\omega$ and one from Stokes vectors $s_1$, $s_a$, $t_1$, and $t_a$ corresponding to frequency $\omega+\Delta\omega_f$. Then, the output PMD vector to first order, i.e., the PMD vector at the output of the optical device under test, is extracted from the two rotation matrices.

Knowledge of the input PMD vector, i.e., the PMD vector at the input of the optical device under test, is desirable under some circumstances. For instance, some PMD compensation schemes rely on the ability to inject the light signal along the input PSP. The algorithm of the present invention calculates the input PMD vector as well.

Determination of Rotation Matrix

As discussed above, the PMD of an optical device, such as a span of fiber, alters the polarization of a light beam by rotating this polarization in Stokes space. A rotation matrix R ($\omega$), which describes this rotation at frequency $\omega$, is calculated from the vectors $s_1$, $s_a$, $t_1$, and $t_a$ corresponding to frequency $\omega$ as follows:

From $t_1$ and $t_a$ we can form an orthonormal basis as follows:

$$t_3 = k t_1 \times t_a,$$

and $$t_2 = t_3 \times t_1, \tag{1}$$

where k is a constant chosen to assure that $|t_3|=1$. Since $s_1$ is aligned with an axis of the Poincaré sphere, the three corresponding output Stokes vectors ($t_1$, $t_2$, and $t_3$) will indicate the rotation due to the optical device under test as $$t = Rs, \tag{2}$$

where R is a 3×3 rotation matrix contained within the Müller matrix and can be written in terms of the components of the output Stokes vectors at frequency $\omega$ as $$R_{ij}^T(\omega) = t_{ij}(\omega), \tag{3}$$

where i identifies the three input and corresponding output polarization states, j identifies the vector components, and $R^T$ denotes the transpose of R. In other words, $$R(\omega) = \begin{bmatrix} t_{11} & t_{21} & t_{31} \\ t_{12} & t_{22} & t_{32} \\ t_{13} & t_{23} & t_{33} \end{bmatrix}, \tag{4}$$

where the $t_{ij}$ are evaluated at frequency $\omega$. Similarly, using measurements at frequency $\omega+\Delta\omega_f$, rotation matrix R ($\omega+\Delta\omega_f$), which describes the rotation of polarization at frequency $\omega+\Delta\omega_f$, can be written as $$R_{ij}^T(\omega+\Delta\omega_f) = t_{ij}(\omega+\Delta\omega_f), \tag{5}$$

In other words, $$R(\omega + \Delta\omega_f) = \begin{bmatrix} t_{11} & t_{21} & t_{31} \\ t_{12} & t_{22} & t_{32} \\ t_{13} & t_{23} & t_{33} \end{bmatrix}, \tag{6}$$

where the $t_{ij}$ are evaluated a frequency $\omega+\Delta\omega_f$.

Determination of the Output PMD Vector

Once rotation matrices R ($\omega$) and R ($\omega+\Delta\omega_f$) are calculated for the frequency pair $\omega$ and $\omega+\Delta\omega_f$, the first-order output PMD vector, designated as $\Omega_t$, may be calculated. As previously described, when an input polarization is fixed, PMD causes the corresponding output polarization, represented by a Stokes vector $t(\omega)$, to rotate in the Poincaré sphere as the frequency $\omega$ changes. This motion is described by $$t_\omega = \Omega_t \times t, \tag{7}$$

where $\Omega_t$ defines the axis of rotation, $t_\omega$ is the frequency derivative of $t(\omega)$, and $$d\phi/d\omega=|\Omega_t|, \quad (8)$$

where $\phi$ is the rotation angle. The magnitude $|\Omega_t|$ equals the differential group delay $\Delta\tau=DGD=|\Omega_t|$ caused by PMD. Combining equations (2) and (7) yields the matrix $$\Omega_t \times = R_\omega R^T \quad (9)$$

for the cross product operator, where $R^T$ is the transpose of R, and $R_\omega$ is the derivative of R.

Some prior art methods, such as the PST method, extract the components of $\Omega_t$ from similar differential expressions and must use small rotation differences $\Delta\phi$ to be accurate. However, because the difference in rotation $\Delta\phi$ is directly related to the frequency interval between polarization state inputs, small rotation differences will correspond to small frequency intervals. As previously described, using small frequency intervals results in several other problems such as inaccuracies in the creation and measurement of small differences between optical frequencies (particularly for high PMD fiber) and low experimental signal-to-noise ratios in the measured data due to polarimeter noise.

The method of the present invention avoids these problems by using a difference rotation matrix, which uses large rotation angles and correspondingly large frequency intervals, to determine the PMD vector instead of equation (9). As described previously, the frequency interval $\Delta\omega_f$ is chosen such that the rotation angle difference is large, but $\Delta\omega_f$ should not exceed $\pi/\Delta\tau_m$, where $\Delta\tau_m$ is the peak PMD of the DUT in the frequency span measured.

The difference rotation matrix $R_\Delta$ is calculated as follows:

Since the difference rotation matrix $R_\Delta$ relates the output Stokes vectors at the pair of frequencies, i.e., $t(\omega+\Delta\omega_f)=R_\Delta t(\omega)$, one obtains $$R_\Delta = R(\omega+\Delta\omega_f)R^T(\omega), \quad (10)$$

where $R^T(\omega)$ is the transpose of $R(\omega)$. The difference rotation $R_\Delta$ can be expressed in terms of its rotation angle $\phi$ and its rotation axis r in the form $$R_\Delta = \cos\phi \cdot I + (1-\cos\phi)rr - \sin\phi \, rx \quad (11)$$

where I is the 3×3 unit matrix, rr is a dyadic, and rx is the cross-product operator. This allows an exact determination of the rotation angle $\phi$ and the elements of the rotation axis $r_i$ for the difference rotation determined by the measured $R(\omega)$ and $R(\omega+\Delta\omega_f)$ matrices:

$$\cos\phi = \tfrac{1}{2}(Tr\, R_\Delta - 1) \quad (12)$$

and $$r_1 \sin\phi = \tfrac{1}{2}(R_{\Delta 23}-R_{\Delta 32}),$$

$$r_2 \sin\phi = \tfrac{1}{2}(R_{\Delta 31}-R_{\Delta 13}),$$

and $$r_3 \sin\phi = \tfrac{1}{2}(R_{\Delta 12}-R_{\Delta 21}) \quad (13)$$

These parameters of the difference rotation are used in combination with equations (7) and (8) to approximate the output PMD vector $\Omega_t = \Delta\tau\, p$ as $$\Delta\tau = |\Omega_t| = \phi/\Delta\omega_f \quad (14)$$

and $$p=r, \quad (15)$$

where p is the Stokes vector of a principal state. $\Omega_t$ is then defined as being at the halfway point between the pair of frequencies used to determine the difference rotation matrix. Thus, here $\Omega_t$ is defined to be at $\omega+\Delta\omega_f/2$.

Determination of the Input PMD Vector

One of two alternative techniques may be used to determine the input PMD vector. The first technique involves calculating the input PMD vector, $\Omega_s$, from $\Omega_t$ and the rotation matrix $R_{\Delta/2}$. Since the PMD vector is a three-dimensional Stokes vector, it will transform (rotate) through the fiber as described by the 3×3 rotation matrix R. Therefore, if we know the output PMD vector, $\Omega_t(\omega_m)$, the input PMD vector, $\Omega_s(\omega_m)$ is just $$\Omega_s(\omega_m)=R^T(\omega_m)\Omega_t(\omega_m), \quad (16)$$

where $\omega_m$ is the midpoint frequency between $\omega$ and $\omega+\Delta\omega_f$, i.e., $\omega_m=(\omega+\Delta\omega_f/2)$ and $R^T(\omega_m)$ is the transpose of $R(\omega_m)$. To determine $R(\omega_m)$, we begin with the fact that at frequency $\omega$, an input vector s is rotated to t via $t=R(\omega)s$. At frequency $\omega+\Delta\omega_f$, the same input vector s is rotated to $t_+$ via $t_+=R(\omega+\Delta\omega_f)s$. Also, $t_+=R_\Delta t$, where $R_\Delta=R(\omega+\Delta\omega_f)R^T(\omega)$.

The output vector $t_m$ at the midpoint frequency $\omega_m$ can be approximated as a rotation of $R_{\Delta/2}$ away from $R(\omega)$ and $R_{\Delta/2}$ less than $R(\omega+\Delta\omega_f)$, where $R_{\Delta/2}$ has the same axis as $R_\Delta$, but one-half the rotation angle $\phi$ of $R_\Delta$. $R_{\Delta/2}$ may be determined from the rotation axis r and rotation angle $\phi$ extracted of $R_\Delta$ as follows:

$$R_{\Delta/2}=\cos\phi/2 \cdot I + (1-\cos\phi/2)rr - \sin\phi/2\, rx. \quad (17)$$

Since $R(\omega+\Delta\omega_f)=R_\Delta R(\omega)$ and $R(\omega)=R^T_\Delta R(\omega+\Delta\omega_f)$, then by analogy the rotation matrix at the midpoint frequency $\omega_m$ is $$R(\omega_m)=R_{\Delta/2}R(\omega)=R^T_{\Delta/2}R(\omega+\Delta\omega_f), \quad (18)$$

As stated above, given the output PMD vector $\Omega_t(\omega_m)$, the input PMD vector $\Omega_s(\omega_m)$ can be determined from $\Omega_s(\omega_m)=R^T(\omega_m)\Omega_t(\omega_m)$.

An alternative technique for determining the input PMD vector is to use the difference rotation matrix $R_{\Delta s}$ where $$R=R^T(\omega)R(\omega+\Delta\omega_f), \quad (19)$$

From this difference rotation matrix, the input PMD vector $\Omega_s$ can be found from $$R_{\Delta s}=\cos\phi \cdot I + (1-\cos\phi)rr - \sin\phi\, rx, \quad (20)$$

using the same procedure as previously described for the output PMD vector $\Omega_t$.

Improving $\Omega(\omega)$ to Frequency Resolution Through Data Interleaving

As discussed previously, using a large frequency interval $\Delta\omega_f$ and correspondingly large rotation difference angle $\Delta\phi$ results in data with a high signal-to-noise ratio. However, within a given frequency range, increasing the frequency interval between data points results in fewer data points and correspondingly lower resolution when describing PMD in relation to frequency or wavelength. Thus a dilemma arises where if the frequency interval is chosen to be small, the signal-to-noise ratio of the measured data is low, but if the frequency interval is chosen to be large, the number of measurements is not enough to provide adequate resolution of the PMD vector with frequency.

This problem is resolved in the method of the present invention through the use of data interleaving. In prior art methods, the same frequency interval is used when measuring the PMD vector and when obtaining the next data point. In other words, for an initial frequency $\omega_0$ and frequency interval $\Delta\omega$, a second data point would be taken at $\omega_1=\omega_0+\Delta\omega$, a third data point would be taken at $\omega_2=\omega_1+\Delta\omega$, etc., and $\Omega(\omega)$ would be determined first from the data points measured at $\omega_0$ and $\omega_1$, next from the data points measured at $\omega_1$ and $\omega_2$, then from the data points measured at $\omega_1$ and $\omega_2$, and so on.

Figure 7:
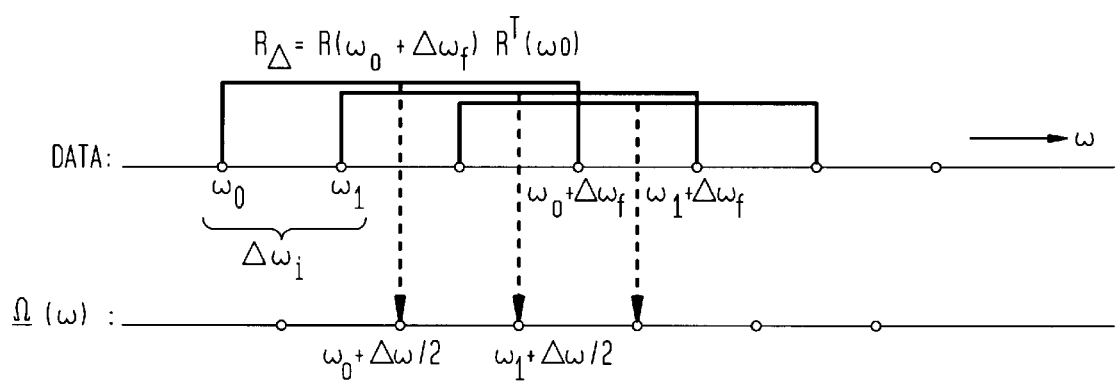
FIG. 7 shows the interleaving performed by method of the present invention.

However, in the method of the present invention, different frequency intervals are used for measuring $\Omega(\omega)$ than are used when moving to the next data point. As shown in FIG. 7, the pair of frequencies which are used in determining each $\Omega(\omega)$, are separated by a frequency interval $\Delta\omega_f$ of which is large. Thus, the first two measurements used are taken at $\omega_0$ and $\omega_0+\Delta\omega_f$. A smaller frequency interval, $\Delta\omega_i$, is then used when moving to the next data point. In other words, each pair of frequencies used to determine each PMD vector is separated by a smaller frequency interval $\Delta\omega_i$. Thus in the present invention, $\omega_1=\omega_0+\Delta\omega_i$ rather than $\omega_1=\omega_0+\Delta\omega_f$ as in the prior art. Therefore, in the method of the present invention, large frequency intervals are used when measuring $\Omega(\omega)$, thus giving data with a high signal-to-noise ratio, and small frequency intervals are used when moving between data points, thus providing enough data points to achieve good $\Omega(\omega)$ to frequency resolution.

It should be noted that $\Delta\omega_i$ may be positive or negative. Also, $\Delta\omega_i$ may vary for different pairs so long as $|\Delta\omega_i|<|\Delta\omega_f|$. In addition, one skilled in the art will appreciate that this technique of data interleaving, i.e., using smaller frequency intervals when moving between data points, can be used with any PMD measurement method to improve $\Omega(\omega)$ to frequency resolution.

Higher order PMD vectors may be obtained from two lower order PMD vectors. Thus, the second order PMD vector $\Omega_\Omega$ may be obtained from two (or more) first order PMD vectors measured at frequency interval $\Delta\omega_i$, e.g.

$$\Omega_\omega=[\Omega(\omega_{i-1})-\Omega(\omega_i)]/\Delta\omega_i \quad (21)$$

Second-order PMD vector data of greater accuracy can be obtained using more sophisticated interpolation techniques.

The method of the present invention is simpler than prior art methods because the algorithm used remains entirely in Stokes space and requires no conversion back and forth to Jones space. In addition, only two distinct polarization states are required as opposed to three in the prior art. Also, the relative angle between the two inputted polarization states need not be known. Finally, large rotation angles and interleaving are used to attain low-noise, high-resolution PMD data.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for testing the performance of an optical device under test using a first and second pair of light beams, wherein each of said pairs of light beams comprises a first light beam having a frequency $\omega_n$ and a second light beam having a frequency $\omega_n+\Delta\omega_{fn}$, wherein n denotes the particular pair, wherein $\Delta\omega_{fn}$ may be either positive or negative, and wherein a first frequency of an (n+1)th pair of light beams is different from the first frequency of an nth pair of light beams by a second frequency interval $\Delta\omega_{in}$, wherein $\Delta\omega_{in}$ may be either positive or negative, and wherein $|\Delta\omega_{in}|<|\Delta\omega_{fn}|$ and $|\Delta\omega_{in}|<|\Delta\omega_{f(n+1)}|$, said method comprising the step of:

determining a polarization mode dispersion vector to at least a first order of said optical device under test using light beams passed therethrough.

2. The method of claim 1, wherein said polarization mode dispersion vectors form a set of vectors comprising at least a first and a second first order vector; and further comprising the step of:

determining a polarization mode dispersion vector to second order from said first and second first order vectors.

3. The method of claim 1, wherein said optical device under test has input and output interfaces, and said step of determining a polarization mode dispersion vector to first order of said optical device under test from each of said pairs of light beams further comprising the steps of:

A. determining a rotation matrix $R^*$, wherein $R^*$ describes the polarization characteristics of an optical device under test at a frequency $\omega$;

B. determining a rotation matrix $R_+$, wherein $R_+$ describes the polarization characteristics of said optical device under test at a frequency $\omega+\Delta\omega_f$;

C. calculating a rotation matrix $R_A$ such that $R_A=R_+R^{*T}$, wherein $R^{*T}$ is the transpose of $R^*$;

D. calculating a positive angle $\phi$ and a vector r, such that said angle $\phi$ and said vector r characterize the rotation represented by said matrix $R_A$ of said polarization characteristics of said optical device under test from said first frequency $\omega$ to said second frequency $\omega+\Delta\omega_f$;

E. calculating a magnitude $\Delta\tau$ such that $\Delta\tau=\phi/\Delta\omega_f$; and F. calculating a polarization mode dispersion vector to first order $\Omega_t$ which describes the polarization mode dispersion at said output interface of said optical device under test, such that $\Omega_t=\Delta\tau r$ and such that $\Omega_t$ is defined to reside at the frequency $\omega+\Delta\omega_f/2$.

4. The method of claim 3, further comprising the step of

G. calculating a polarization mode dispersion vector to first order $\Omega_s$ which describes the polarization mode dispersion at said input interface of said optical device under test.

5. The method of claim 4, wherein said step G) further comprises the steps of:

calculating a rotation matrix $R_{A/2}$ from said angle $\phi$ and said vector r, such that $R_{A/2}=\cos\phi/2 \cdot I+(1-\cos\phi/2)rr-\sin\phi/2 rx$;

calculating a rotation matrix $R_m$ such that $R_m=R_{A/2} R^*$; and calculating said vector $\Omega_s$ such that $\Omega_s=R_m^T\Omega_t$.

6. The method of claim 4, wherein said step G) further comprises the steps of:

calculating a rotation matrix $R_{As}$ such that $R_{As}=R^{*T}R_+$, wherein $R^{*T}$ is the transpose of $R^*$;

calculating a positive angle $\phi$ and a vector r, such that said angle $\phi$ and said vector r characterize the rotation represented by said matrix $R_{As}$ of said polarization characteristics of said optical device under test from said first frequency $\omega$ to said second frequency $\omega+\Delta\omega_f$;

calculating a magnitude $\Delta\tau$ such that $\Delta\tau=\phi/\Delta\omega_f$; and calculating a polarization mode dispersion vector to first order $\Omega_s$ which describes the polarization mode dispersion at said input interface of said optical device under test, such that $\Omega_s=\Delta\tau r$, and such that $\Omega_s$ is defined to reside at the frequency $\omega+\Delta\omega_f/2$.

7. The method of claim 6, wherein said step of calculating a positive angle $\phi$ and a vector r, wherein said vector r comprises components $r_1$, $r_2$, and $r_3$, said method further comprising the steps of:

calculating $\phi$, such that $\cos\phi=\frac{1}{2}(\text{Tr } R_A-1)$, wherein Tr $R_A=R_{A11}+R_{A22}+R_{A33}$;

calculating $r_1$, such that $r_1 \sin \phi = \frac{1}{2}(R_{A23}-R_{A32})$;

calculating $r_2$, such that $r_2 \sin \phi = \frac{1}{2}(R_{A31}-R_{A13})$; and calculating $r_3$, such that $r_3 \sin \phi = \frac{1}{2}(R_{A12}-R_{A21})$.

8. The method of claim 3, wherein said step of calculating a positive angle $\phi$ and a vector r, wherein said vector r comprises components $r_1$, $r_2$, and $r_3$, said method further comprising the steps of:

calculating $\phi$, such that $\cos \phi = \frac{1}{2}(\text{Tr } R_A-1)$, wherein $\text{Tr } R_A = R_{A11}+R_{A22}+R_{66\,33}$;

calculating $r_1$, such that $r_1 \sin \phi = \frac{1}{2}(R_{A23}-R_{A32})$;

calculating $r_2$, such that $r_2 \sin \phi = \frac{1}{2}(R_{A31}-R_{A13})$; and calculating $r_3$, such that $r_3 \sin \phi = \frac{1}{2}(R_{A12}-R_{A21})$.

9. The method of claim 3, wherein said step of determining a rotation matrix R* further comprises the steps of:

A1) producing a first and a second light beam at said first frequency $\omega$;

A2) imparting a first polarization state to said first light beam produced at said frequency $\omega$, such that a vector $s^*_1$ represents in Stokes space said first polarization state imparted to said first light beam produced at said frequency $\omega$;

A3) imparting a second polarization state to said second light beam produced at said frequency $\omega$, such that a vector $s^*_a$ representing in Stokes space said second polarization state imparted to said second light beam produced at said frequency $\omega$ is not parallel or anti-parallel to said vector $s^*_1$;

A4) coupling said first and second light beams having a frequency $\omega$ to said input interface of said optical device under test such that said first and second light beams having a frequency $\omega$ propagate through said optical device under test;

A5) measuring the polarization state of said first and second light beams having a frequency $\omega$ at said output interface of said optical device under test;

A6) determining vectors to represent in Stokes space said measured polarization states of said first and second light beams having a frequency $\omega$, such that a vector $t^*_1$ represents said measured polarization state of said first light beam produced at said frequency $\omega$, and such that a vector $t^*_a$ represents said measured polarization state of said second light beam produced at said frequency $\omega$, and A7) calculating a vector $t^*_3$ such that $t^*_3 = k\, t^*_1 \times t^*_a$, wherein k is a constant chosen to assure that $|t^*_3|=1$;

A8) calculating a vector $t^*_2$ such that $t^*_2 = t^*_3 \times t^*_1$;

A9) calculating a rotation matrix R*, such that $$R_* = \begin{bmatrix} t_{*11} & t_{*21} & t_{*31} \\ t_{*12} & t_{*22} & t_{*32} \\ t_{*13} & t_{*23} & t_{*33} \end{bmatrix};$$

and wherein said step of determining a rotation matrix $R_+$ further comprises the steps of:

B1) producing a first and a second light beam at said second frequency $\omega+\Delta\omega_f$;

B2) imparting a first polarization state to said first light beam produced at said frequency $\omega+\Delta\omega_f$, such that a vector $s_{+1}$ represents in Stokes space said first polarization state imparted to said first light beam produced at said frequency or $\omega+\Delta\omega_f$;

B3) imparting a second polarization state to said second light beam produced at said frequency $\omega+\Delta\omega_f$, such that a vector $s_{+a}$ representing in Stokes space said second polarization state imparted to said second light beam produced at said frequency $\omega+\Delta\omega_f$ is not parallel or anti-parallel to said vector $s_{+1}$;

B4) coupling said first and second light beams having a frequency $\omega+\Delta\omega_f$ to said input interface of said optical device under test such that said first and second light beams having a frequency $\omega+\Delta\omega_f$ propagate through said optical device under test;

B5) measuring the polarization state of said first and second light beams having a frequency $\omega+\Delta\omega_f$ at said output interface of said optical device under test;

B6) determining vectors to represent in Stokes space said measured polarization states of said first and second light beams having a frequency $\omega+\Delta\omega_f$, such that a vector $t_{+1}$ represents said measured polarization state of said first light beam produced at said frequency $\omega+\Delta\omega_f$, and such that a vector $t_{+a}$ represents said measured polarization state of said second light beam produced at said frequency $\omega+\Delta\omega_f$;

B7) calculating a vector $t_{+3}$ such that $t_{+3} = k\, t_{+1} \times t_{+a}$, wherein k is a constant chosen to assure that $|t_{+3}|=1$;

B8) calculating a vector $t_{+2}$ such that $t_{+2} = t_{+3} \times t_{+1}$; and B9) calculating a matrix $R_+$, such that $$R_+ = \begin{bmatrix} t_{+11} & t_{+21} & t_{+31} \\ t_{+12} & t_{+22} & t_{+32} \\ t_{+13} & t_{+23} & t_{+33} \end{bmatrix}.$$

10. A method for testing the performance of an optical device under test (DUT) having input and output interfaces by determining the polarization mode dispersion vector of said optical device under test using a pair of light beams applied to said input interface of said DUT and having, respectively, a first frequency $\omega$ and a second frequency $\omega+\Delta\omega_f$, wherein $\Delta\omega_f$ may be either positive or negative, said method comprising the steps of:

A. determining a rotation matrix R*, wherein R* describes the polarization characteristics of an optical device under test at said first frequency $\omega$;

B. determining a rotation matrix $R_+$, wherein $R_+$ describes the polarization characteristics of said optical device under test at said second frequency $\omega+\Delta\omega_f$;

C. calculating a rotation matrix $R_A$ such that $R_A = R_+ R^{*T}$, wherein $R^{*T}$ is the transpose of R*;

D. calculating a positive angle $\phi$ and a vector r, such that said angle $\phi$ and said vector r characterize the rotation represented by said matrix $R_A$ of said polarization characteristics of said optical device under test from said first frequency $\omega$ to said second frequency $\omega+\Delta\omega_f$;

E. calculating a magnitude $\Delta\tau$ such that $\Delta\tau = \phi/\Delta\omega_f$; and F. calculating a polarization mode dispersion vector to first order $\Omega_t$ which describes the polarization mode dispersion at said output interface of said optical device under test, such that $\omega_t = \Delta\tau r$, and such that $\Omega_t$ is defined to reside at the frequency $\omega+\Delta\omega_f/2$.

11. The method of claim 10, further comprising the step of

G) calculating a polarization mode dispersion vector to first order $\Omega_s$ which describes the polarization mode dispersion at said input interface of said optical device under test.

12. The method of claim 11, wherein said step G) further comprises the steps of:
   calculating a rotation matrix $R_{\Delta/2}$ from said angle $\phi$ and said vector r, such that $R_{\Delta/2}=\cos \phi/2 \cdot I+(1-\cos \phi/2)rr-\sin \phi/2 rx$;
   calculating a rotation matrix $R_m$ such that $R_m=R_{\Delta/2}R^*$; and
   calculating said vector $\Omega_s$ such that $\Omega_s=R_m^T\Omega_t$.

13. The method of claim 11, wherein said step G) further comprises the steps of:
   calculating a rotation matrix $R_{\Delta s}$ such that $R_{\Delta s}=R^{*T}R_+$, wherein $R^{*T}$ is the transpose of $R^*$,
   calculating a positive angle $\phi$ and a vector r, such that said angle $\phi$ and said vector r characterize the rotation represented by said matrix $R_{\Delta s}$ of said polarization characteristics of said optical device under test from said first frequency $\omega$ to said second frequency $\omega+\Delta\omega_f$;
   calculating a magnitude $\Delta\tau$ such that $\Delta\tau=\phi/\Delta\omega_f$; and
   calculating a polarization mode dispersion vector to first order $\Omega_s$ which describes the polarization mode dispersion at said input interface of said optical device under test, such that $\Omega_s=\Delta\tau r$, and such that $\Omega_s$ is defined to reside at the frequency $\omega+\Delta\omega_f/2$.

14. The method of claim 13, wherein said step of calculating a positive angle $\phi$ and a vector r, wherein said vector r comprises components $r_1$, $r_2$, and $r_3$, further comprises the steps of:
   calculating $\phi$, such that $\cos \phi=\frac{1}{2}(TrR_\Delta-1)$, wherein $TrR_\Delta=R_{\Delta 11}+R_{\Delta 22}+R_{\Delta 33}$;
   calculating $r_1$, such that $r_1 \sin \phi=\frac{1}{2}(R_{\Delta 23}-R_{\Delta 32})$;
   calculating $r_2$, such that $r_2 \sin \phi=\frac{1}{2}(R_{\Delta 31}-R_{\Delta 13})$; and
   calculating $r_3$, such that $r_3 \sin \phi=\frac{1}{2}(R_{\Delta 12}-R_{\Delta 21})$.

15. The method of claim 10, wherein said step of calculating a positive angle $\phi$ and a vector r, wherein said vector r comprises components $r_1$, $r_2$, and $r_3$, further comprises the steps of:
   calculating $\phi$, such that $\cos \phi=\frac{1}{2}(TrR_\Delta-1)$, wherein $TrR_\Delta=R_{\Delta 11}+R_{\Delta 22}+R_{\Delta 33}$;
   calculating $r_1$, such that $r_1 \sin \phi=\frac{1}{2}(R_{\Delta 23}-R_{\Delta 32})$;
   calculating $r_2$, such that $r_2 \sin \phi=\frac{1}{2}(R_{\Delta 31}-R_{\Delta 13})$; and
   calculating $r_3$, such that $r_3 \sin \phi=\frac{1}{2}(R_{\Delta 12}-R_{\Delta 21})$.

16. The method of claim 10, wherein said step of determining a rotation matrix $R^*$ further comprises the steps of:
   A1) producing a first and a second light beam at said first frequency $\omega$;
   A2) imparting a first polarization state to said first light beam produced at said frequency $\omega$, such that a vector $s^*_1$ represents in Stokes space said first polarization state imparted to said first light beam produced at said frequency $\omega$;
   A3) imparting a second polarization state to said second light beam produced at said frequency $\omega$, such that a vector $s^*_a$ representing in Stokes space said second polarization state imparted to said second light beam produced at said frequency $\omega$ is not parallel or anti-parallel to said vector $s^*_1$;
   A4) coupling said first and second light beams having a frequency $\omega$ to said input interface of said optical device under test such that said first and second light beams having a frequency $\omega$ propagate through said optical device under test;
   A5) measuring the polarization state of said first and second light beams having a frequency $\omega$ at said output interface of said optical device under test;
   A6) determining vectors to represent in Stokes space said measured polarization states of said first and second light beams having a frequency $\omega$,
   such that a vector $t^*_1$ represents said measured polarization state of said first light beam produced at said frequency $\omega$, and
   such that a vector $t^*_a$ represents said measured polarization state of said second light beam produced at said frequency $\omega$, and
   A7) calculating a vector $t^*_3$ such that $t^*_3=k\ t^*_1 \times t^*_a$, wherein k is a constant chosen to assure that $|t^*_3|=1$;
   A8) calculating a vector $t^*_2$ such that $t^*_2=t^*_3 \times t^*_1$;
   A9) calculating a matrix $R^*$, such that $$R_* = \begin{bmatrix} t_{*11} & t_{*21} & t_{*31} \\ t_{*12} & t_{*22} & t_{*32} \\ t_{*13} & t_{*23} & t_{*33} \end{bmatrix};$$

and
wherein said step of determining a rotation matrix $R_+$ further comprises the steps of:
   B1) producing a first and a second light beam at said second frequency $\omega+\Delta\omega_f$;
   B2) imparting a first polarization state to said first light beam produced at said frequency $\omega+\Delta\omega_f$, such that a vector $s_{-1}$ represents in Stokes space said first polarization state imparted to said first light beam produced at said frequency $\omega+\Delta\omega_f$;
   B3) imparting a second polarization state to said second light beam produced at said frequency $\omega+\Delta\omega_f$, such that a vector $s_{+a}$ representing in Stokes space said second polarization state imparted to said second light beam produced at said frequency $\omega+\Delta\omega_f$ is not parallel or anti-parallel to said vector $s_{+1}$;
   B4) coupling said first and second light beams having a frequency $\omega+\Delta\omega_f$ to said input interface of said optical device under test such that said first and second light beams having a frequency $\omega+\Delta\omega_f$ propagate through said optical device under test;
   B5) measuring the polarization state of said first and second light beams having a frequency $\omega+\Delta\omega_f$ of at said output interface of said optical device under test;
   B6) determining vectors to represent in Stokes space said measured polarization states of said first and second light beams having a frequency $\omega+\Delta\omega_f$,
   such that a vector $t_{+1}$ represents said measured polarization state of said first light beam produced at said frequency $\omega+\Delta\omega_f$, and
   such that a vector $t_{+a}$ represents said measured polarization state of said second light beam produced at said frequency $\omega+\Delta\omega_f$;
   B7) calculating a vector $t_{+3}$ such that $t_{-3}=k\ t_{-1} \times t_{+a}$, wherein k is a constant chosen to assure that $|t_{+3}|=1$;
   B8) calculating a vector $t_{+2}$ such that $t_{+2}=t_{+3} \times t_{+1}$; and
   B9) calculating a matrix $R_+$, such that $$R_+ = \begin{bmatrix} t_{+11} & t_{+21} & t_{+31} \\ t_{+12} & t_{+22} & t_{+32} \\ t_{+13} & t_{+23} & t_{+33} \end{bmatrix}.$$

17. An apparatus for testing the performance of an optical device under test (DUT) having input and output interfaces by determining the polarization mode dispersion vector of said optical device under test using a pair of light beams applied to said input interface of said DUT and having respectively, a first frequency ω and a second frequency ω+Δω$_f$, wherein Δω$_f$ may be either positive or negative, comprising:
- A. at least one rotation matrix determining device which first determines a rotation matrix R*, wherein R* describes the polarization characteristics of an optical device under test at said first frequency ω, and then determines a rotation matrix R$_+$, wherein R$_+$ describes the polarization characteristics of said optical device under test at said second frequency ω+Δω$_f$;
- B. at least one calculation device which calculates
  - i. a rotation matrix R$_A$ such that R$_A$=R$_+$R*$^T$, wherein R*$^T$ is the transpose of R$_+$;
  - ii. a positive angle φ and a vector r, such that said angle φ and said vector r characterize the rotation represented by said matrix R$_A$ of said polarization characteristics of said optical device under test from said first frequency ω to said second frequency ω+Δω$_f$;
  - iii. a magnitude Δτ such that Δτ=φ/Δω$_f$; and
  - iv. a polarization mode dispersion vector to first order Ω$_t$ which describes the polarization mode dispersion at said output interface of said optical device under test, such that Ω$_t$=Δτr, and such that Ω$_t$ is defined to reside at the frequency ω+Δω$_f$/2.

18. The apparatus of claim 17, wherein said calculation device further calculates
a polarization mode dispersion vector to first order Ω$_s$ which describes the polarization mode dispersion at said input interface of said optical device under test.

19. The apparatus of claim 17, wherein said calculation device comprises electrical circuits.

20. The apparatus of claim 17, wherein said calculation device is a computer processor.

21. The apparatus of claim 17, wherein said rotation matrix determining device comprises:
- A1) an optical source device which produces a first and a second light beam to be passed through said optical device under test, first at said first frequency ω and then at said frequency ω+Δω$_f$;
- A2) a polarizing device which
  - imparts a first polarization state to said first light beam produced at said frequency ω, such that a vector s*$_1$ represents in Stokes space said first polarization state imparted to said first light beam produced at said frequency ω, and
  - imparts a second polarization state to said second light beam produced at said frequency ω, such that a vector s*$_a$ representing in Stokes space said second polarization state imparted to said second light beam produced at said frequency ω is not parallel or anti-parallel to said vector s*$_1$, and
  - imparts a first polarization state to said first light beam produced at said frequency ω+Δω$_f$, wherein a vector s$_{+1}$ represents in Stokes space said first polarization state imparted to said first light beam produced at said frequency ω+Δω$_f$, and
  - imparts a second polarization state to said second light beam produced at said frequency ω+Δω$_f$, such that a vector s$_{+a}$ representing in Stokes space said second polarization state imparted to said second light beam produced at said frequency ω+Δω$_f$ is not parallel or anti-parallel to said vector s$_{+1}$; and
- A3) a measuring device which
  - measures the polarization state of each of said light beams after each of said beams has passed through said optical device under test, and
  - determines a vector to represent in Stokes space each of said measured polarization states of each of said light beams,
  - such that a vector t*$_1$ represents said measured polarization state of said first light beam produced at said frequency ω, and
  - such that a vector t*$_a$ represents said measured polarization state of said second light beam produced at said frequency ω, and
  - such that a vector t$_{+1}$ represents said measured polarization state of said first light beam produced at said frequency ω+Δω$_f$, and
  - such that a vector t$_{+a}$ represents said measured polarization state of said second light beam produced at said frequency ω+Δω$_f$.

22. A method for determining polarization mode dispersion (PMD) for an optical device under test (DUT), said method comprising:
for a first light beam having a first frequency and a first polarization state, a second light beam having said first frequency and a second polarization state, a third light beam having a second frequency and said first polarization state, and a fourth light beam having said second frequency and said second polarization state, said first and second frequencies comprising a first pair of frequencies, said first and second polarization states inserted in said DUT comprising input polarization states having Stokes vectors, and said second frequency being greater than said first frequency, performing the steps of:
- (A) inserting each of the light beams sequentially into said DUT;
- (B) measuring a respective output polarization state for each of said light beams exiting said DUT;
- (C) determining Stokes vectors for said output polarization state for each of said light beams;
- (D) determining a first order PMD vector from the Stokes vectors of said input polarization state and said output polarization state of said light beams; and for a fifth light beam having a third frequency and said first polarization state, a sixth light beam having said third frequency and said second polarization state, a seventh light beam having a fourth frequency and said first polarization state, and a eighth light beam having said fourth frequency and said second polarization state, said third and fourth frequencies comprising a second pair of frequencies, said first and second polarization states inserted in said DUT comprising input polarization states having Stokes vectors, said fourth frequency being greater than said third frequency, said second pair of frequencies being greater than said first pair of frequencies by a frequency interval less than said second frequency, performing the steps of:
- (E) inserting each of the second set of light beams sequentially into said DUT;
- (F) measuring a respective output polarization state for each of said second set of light beams exiting said DUT;
- (G) determining Stokes vectors for said output polarization state for each of said second set of light beams; and
- (H) determining a second order PMD vector from the Stokes vectors of said input polarization state and said output polarization state of said second set of light beams.

23. The method of claim 22, wherein said polarization mode dispersion vectors to a first order are defined herein as "first order vectors", and wherein all said first order vectors form a set of vectors comprising at least a first and a second order vector; and further comprising the step of determining a polarization mode dispersion vector to a second order from said first and second order PMD vectors.

24. The method of claim 22, wherein said optical device under test has input and output interfaces, and said step of determining a polarization mode dispersion vector to first order of said optical device under test from each of said pairs of frequencies, further comprising the steps of:
A. determining a rotation matrix $R^*$, wherein $R^*$ describes the polarization characteristics of an optical device under test at said first frequency $\omega$;
B. determining a rotation matrix $R_+$, wherein $R_+$ describes the polarization characteristics of said optical device under test at said second frequency $\omega+\Delta\omega_f$;
C. calculating a rotation matrix $R_A$ such that $R_A=R_+R^{*T}$, wherein $R^{*T}$ is the transpose of $R^*$;
D. calculating a positive angle $\phi$ and a vector r, such that said angle $\phi$ and said vector r characterize the rotation represented by said matrix $R_A$ of said polarization characteristics of said optical device under test from said first frequency $\omega$ to said second frequency $\omega+\Delta_f$;
E. calculating a magnitude $\Delta\tau$ such that $\Delta\tau=\phi/\Delta\omega_f$; and
F. calculating a polarization mode dispersion vector to first order $\Omega_t$ which describes the polarization mode dispersion at said output interface of said optical device under test, such that $\Omega_t=\Delta\tau r$, and such that $\Omega_t$ is defined to reside at the frequency $\omega+\Delta\omega_f/2$.

25. The method of claim 24, further comprising the step of
G. calculating a polarization mode dispersion vector to first order $\Omega_s$ which describes the polarization mode dispersion at said input interface of said optical device under test.

26. The method of claim 25, wherein said step G) further comprises the steps of:
calculating a rotation matrix $R_{A/2}$ from said angle $\phi$ and said vector r, such that $R_{A/2}=\cos\phi/2\cdot I +(1-\cos\phi/2)rr-\sin\phi/2rx$;
calculating a rotation matrix $R_m$ such that $R_m=R_{A/2}R^*$; and
calculating said vector $\Omega_s$ such that $\Omega_s=R_m^T\Omega_t$.

27. The method of claim 25, wherein said step G) further comprises the steps of:
calculating a rotation matrix $R_{As}$ such that $R_{As}=R^{*T}R_+$, wherein $R^{*T}$ is the transpose of $R^*$;
calculating a positive angle $\phi$ and a vector r, such that said angle $\phi$ and said vector r characterize the rotation represented by said matrix $R_{As}$ of said polarization characteristics of said optical device under test from said first frequency $\omega$ to said second frequency $\omega+\Delta\omega_f$;
calculating a magnitude $\Delta\tau$ such that $\Delta\tau=\phi/\Delta\omega_f$; and
calculating a polarization mode dispersion vector to first order $\Omega_s$ which describes the polarization mode dispersion at said input interface of said optical device under test, such that $\Omega_s=\Delta\tau r$, and such that $\Omega_s$ is defined to reside at the frequency $\omega+\Delta\omega_f/2$.

28. The method of claim 27, wherein said step of calculating a positive angle $\phi$ and a vector r, wherein said vector r comprises components $r_1$, $r_2$, and $r_3$, said method further comprising the steps of:
calculating $\phi$, such that $\cos\phi=\_(Tr\ R_A-1)$, wherein Tr $R_A=R_{A11}+R_{A22}+R_{A33}$;

calculating $r_1$, such that $r_1 \sin\phi=\_(R_{A23}-R_{A32})$;
calculating $r_2$, such that $r_2 \sin\phi=\_(R_{A31}-R_{A13})$; and
calculating $r_3$, such that $r_3 \sin\phi=\_(R_{A12}-R_{A21})$.

29. The method of claim 24, wherein said step of calculating a positive angle $\phi$ and a vector r, wherein said vector r comprises components $r_1$, $r_2$, and $r_3$, said method further comprising the steps of:
calculating $\phi$, such that $\cos\phi=\_(Tr\ R_A-1)$, where in Tr $R_A=R_{A11}+R_{A22}+R_{A33}$;
calculating $r_1$, such that $r_1 \sin\phi=\_(R_{A23}-R_{A32})$;
calculating $r_2$, such that $r_2 \sin\phi=\_(R_{A31}-R_{A13})$; and
calculating $r_3$, such that $r_3 \sin\phi=\_(R_{A12}-R_{A21})$.

30. The method of claim 24, wherein said step of determining a rotation matrix $R^*$ further comprises the steps of:
A1) producing a first and a second light beam at said first frequency $\omega$;
A2) imparting a first polarization state to said first light beam produced at said frequency $\omega$, such that a vector $s^*_1$ represents in Stokes space said first polarization state imparted to said first light beam produced at said frequency $\omega$;
A3) imparting a second polarization state to said second light beam produced at said frequency $\omega$, such that a vector $s^*_a$ representing in Stokes space said second polarization state imparted to said second light beam produced at said frequency $\omega$ is not parallel or antiparallel to said vector $s^*_1$;
A4) coupling said first and second light beams having a frequency $\omega$ to said input interface of said optical device under test such that said first and second light beams having a frequency $\omega$ propagate through said optical device under test;
A5) measuring the polarization state of said first and second light beams having a frequency $\omega$ at said output interface of said optical device under test;
A6) determining vectors to represent in Stokes space said measured polarization states of said first and second light beams having a frequency $\omega$,
such that a vector $t^*_1$ represents said measured polarization state of said first light beam produced at said frequency $\omega$, and
such that a vector $t^*_a$ represents said measured polarization state of said second light beam produced at said frequency $\omega$, and
A7) calculating a vector $t^*_3$ such that $t^*_3=k\ t^*_1\times t^*_a$, wherein k is a constant chosen to assure that $|t^*_3|=1$;
A8) calculating a vector $t^*_2$ such that $t^*_2=t^*_3\times t^*_1$;
A9) calculating a rotation matrix $R^*$, such that $$R_* = \begin{bmatrix} t_{*11} & t_{*21} & t_{*31} \\ t_{*12} & t_{*22} & t_{*32} \\ t_{*13} & t_{*23} & t_{*33} \end{bmatrix};$$

and
wherein said step of determining a rotation matrix $R_+$ further comprises the steps of:
B1) producing a first and a second light beam at said second frequency $\omega+\Delta\omega_f$;
B2) imparting a first polarization state to said first light beam produced at said frequency $\omega+\Delta\omega_f$, such that a vector $s_{+1}$ represents in Stokes space said first polarization state imparted to said first light beam produced at said frequency $\omega+\Delta\omega_f$;

B3) imparting a second polarization state to said second light beam produced at said frequency $\omega+\Delta\omega_f$, such that a vector $s_{+a}$ representing in Stokes space said second polarization state imparted to said second light beam produced at said frequency $\omega+\Delta\omega_f$ is not parallel or anti-parallel to said vector $s_{+1}$;

B4) coupling said first and second light beams having a frequency $\omega+\Delta\omega_f$ to said input interface of said optical device under test such that said first and second light beams having a frequency $\omega+\Delta\omega_f$ propagate through said optical device under test;

B5) measuring the polarization state of said first and second light beams having a frequency $\omega+\Delta\omega_f$ at said output interface of said optical device under test;

B6) determining vectors to represent in Stokes space said measured polarization states of said first and second light beams having a frequency $\omega+\Delta\omega_f$, such that a vector $t_{+1}$ represents said measured polarization state of said first light beam produced at said frequency $\omega+\Delta\omega_f$, and such that a vector $t_{+a}$ represents said measured polarization state of said second light beam produced at said frequency $\omega+\Delta\omega_f$;

B7) calculating a vector $t_{+3}$ such that $t_{+3}=k\ t_{+1}\times t_{+a}$, wherein k is a constant chosen to assure that $|t_{+3}|=1$;

B8) calculating a vector $t_{+2}$ such that $t_{+2}=t_{+3}\times t_{+1}$; and

B9) calculating a matrix $R_+$, such that $$R_+ = \begin{bmatrix} t_{+11} & t_{+21} & t_{+31} \\ t_{+12} & t_{+22} & t_{+32} \\ t_{+13} & t_{+23} & t_{+33} \end{bmatrix}.$$

\* \* \* \* \*